(No Model.)
C. F. HOLDSHIP.
FILTERING APPARATUS.
No. 301,894. Fig 1. Patented July 15, 1884.
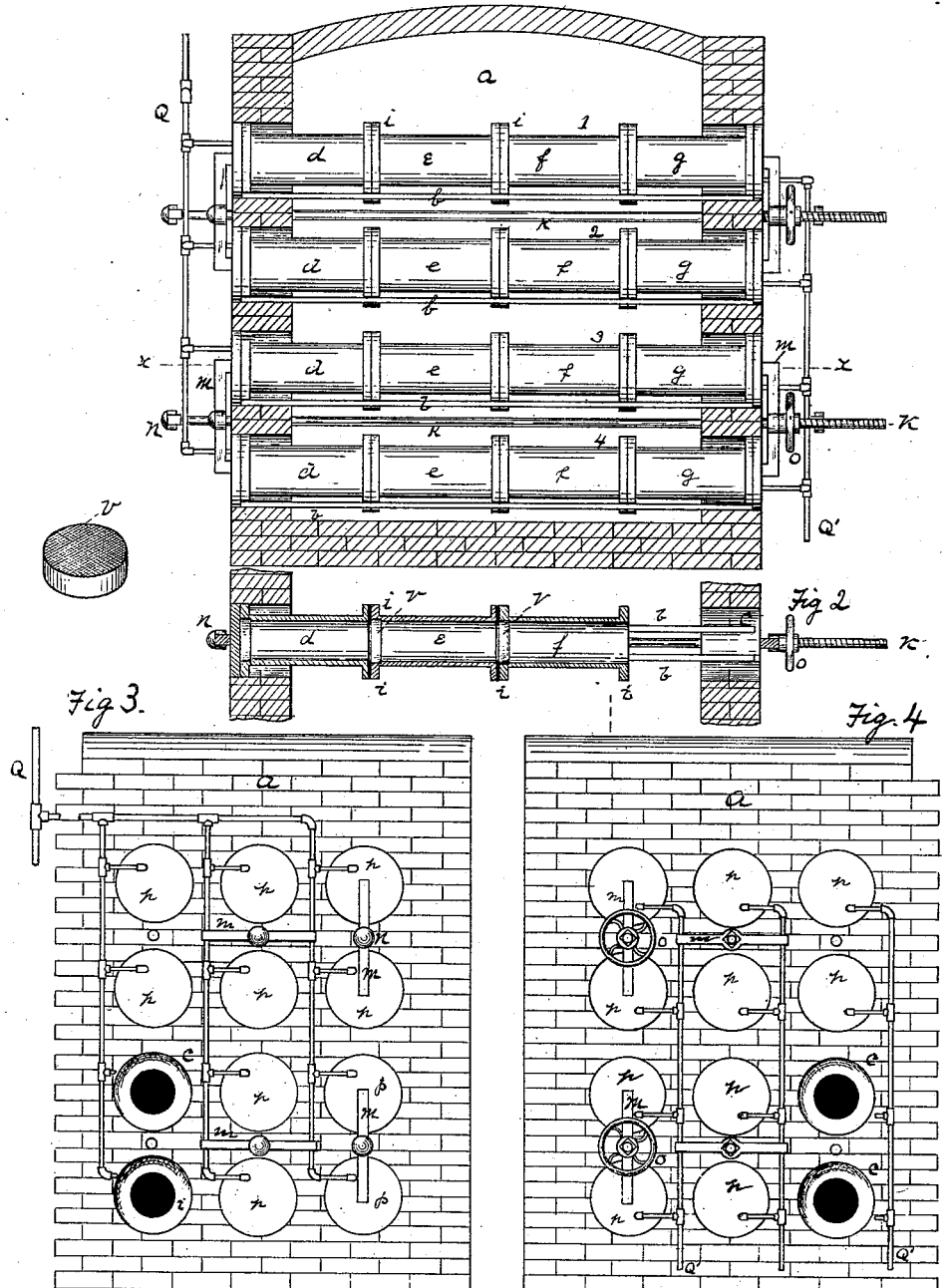
Witnesses
Oliver O. Page.
B. C. Bakewell
Inventor
Charles Frederick Holdship
by his Attorneys
Bakewell & Kerr

UNITED STATES PATENT OFFICE.

CHARLES FREDERICK HOLDSHIP, OF ALLEGHENY, PENNSYLVANIA.

FILTERING APPARATUS.

SPECIFICATION forming part of Letters Patent No. 301,894, dated July 15, 1884.

Application filed December 19, 1883. (No model.)

*To all whom it may concern:*

Be it known that I, CHARLES FREDERICK HOLDSHIP, of the city of Allegheny, in the county of Allegheny and State of Pennsylvania, have invented a new and useful Improvement in Filtering Apparatus; and I do hereby declare the following to be a full, clear, and exect description thereof.

My invention relates to an improvement in apparatus for filtering and decolorizing oils, liquids, and other substances—such as sugar when in a liquid state—and it consists in the arrangement and construction of the devices hereinafter described.

It is well known that the filtering material contained in filters or percolators in time becomes spent or clogged with the coloring or foreign matter which is separated from the liquid during the filtering operation, and also that the filtering material nearer the inlet of the liquid becomes spent and clogged before that portion of the filtering material next to the outlet or exit point. Owing to this fact it is necessary in most filters either to remove the filtering material and insert a fresh supply into the filter before the entire amount of filtering material is spent, or to force the liquid by pressure through the clogged portion of the filter into that portion where the material is still comparatively fresh.

The object of my invention is therefore to enable the clogged or spent filtering material to be removed from the filter without disturbing the remaining portion, which is still fresh, and thereby I am enabled to utilize the entire amount of filtering material contained in the filter without any loss of time, material, or labor.

In order to attain the object of my invention, I employ a filter composed of a cylinder or a series of cylinders, which are adapted to contain the filtering material, and each of which is formed in sections, which are firmly united, so as to form a continuous cylinder, and yet in such a manner that the first section may be removed from the others, which are then moved forward so that the second shall take the place of the first, and another section containing fresh filtering material is inserted in the place first occupied by the last of the sections composing the cylinder.

I will now describe my invention so that others skilled in the art may manufacture and use the same, reference being had to the accompanying drawings, forming part of this specification, in which—

Figure 1 is a side elevation of my improved apparatus. Fig. 2 is a horizontal sectional view through one of the cylinders on the line $xx$ in Fig. 1. Figs. 3 and 4 are end elevations of the apparatus.

Like letters of reference indicate like parts wherever they occur.

In the drawings my improved apparatus is shown as adapted for the filtration of petroleum, hydrocarbon, or other oils or liquids where heat is employed as an additional agent, and it is composed of a heating-chamber, $a$, the walls of which are formed of brick or other heat-resisting material, which heating-chamber is adapted to confine heated air or steam around the filtering-chambers according to the degree of heat required. Extending transversely across the chamber $a$ are the horizontal parallel bars $b$, which form tracks or ways, which afford a support for the filtering-cylinders. These cylinders, resting on the ways $b$, extend across the chamber $a$ in parallel rows, and in the walls of the chamber $a$, at the ends of each of the cylinders, is a circular opening, $c$, equal in diameter with the heads of the cylinders. These cylinders are composed of a series of sections, $d\ e\ f\ g$, on the ends of which are flanges $i$, between which packing is placed when the pipes are joined to prevent the escape of the liquid during its passage through the filter. This packing may be of any suitable material placed between the meeting edges of the flanges $i$.

As it is necessary to force certain liquids through the filter under pressure, the joints where the sections of the cylinder unite with each other must be tight, else the liquid will escape; and in order to effect this a rod, $k$, extends through the chamber $a$, between each two of the cylinders parallel thereto, and outside of the chamber $a$ and on each end of the rods is pivoted a cross-bar, $m$, one of which cross-bars is secured on the rod by the head or nut $n$, and the other at the other end of the rod by a hand-screw, $o$, which engages with a screw-thread on the end of the rod.

The extremities of these bars m bear against the heads of the cylinders, and by means of the screw o a sufficient amount of pressure is brought to bear on the caps of the cylinders, to form a tight and perfect union of the sections.

Inside of the sections of the cylinders is placed any suitable filtering material—such as bone-black, charcoal, or other substance—which is retained in the sections by the gage disks or caps v. The sections are then placed in the chamber a on the ways b, packing being placed between the meeting ends. Disks p are then placed over the ends of the cylinder thus formed, forming a tight cover, and the ends of the arms m are brought over the disks or caps. By means of the screw o pressure is brought to bear on the caps, tightening the joints of the sections. Suitable supply and outlet pipes, Q Q', are connected with the cylinders, the liquid being conducted to the filter from an elevated supply-tank. When the filtering material in the first section, d, of the cylinder becomes spent, the flow of liquid is shut off by means of a suitable stop-cock. The screw o is then loosened, the supply and exit pipes disengaged, and the section d is removed from the air-chamber. The remaining sections are then moved along the track until the second section, e, takes the place of the first. Another section containing fresh filtering material is then placed in the position before occupied by the last of the sections, g, the covers are fitted on the ends of the cylinder, the cross-bars are then brought over the covers and pressure is applied thereto by the screw o, the supply and outlet pipes are connected with the cylinder, and the filtering operation is continued as before.

By forming the sections d e f g of the proper dimensions in the filtration of petroleum, colorless oil may be obtained during the entire process, and yet at the same time the entire filtering properties of the material are utilized, since while the material in the first remaining sections e f g is so far spent that it will not entirely decolorize the oil, yet it aids in filtering it. The material in the section added to the series of sections, and occupying the space before occupied by the section g, being fresh, completes the decolorization.

I am aware that percolators formed in removable sections have been used before. I therefore do not desire, broadly, to claim the same; but,

Having thus described my invention, what I claim and desire to secure by Letters Patent, is—

1. A filter consisting of a series of removable sections containing filtering material and placed end to end, so as to form a continuous cylinder, a clamping device for clamping the sections together, so as to close the joints, and inlet and outlet pipes, the sections being arranged and supported so that the first of the series may be removed, the remaining sections advanced, and a freshly-charged section inserted at the end of the series, substantially as and for the purpose specified.

2. A filter consisting of a series of removable sections united by a tight joint, so as to form a continuous cylinder, removable caps or covers, a clamping device, and tracks or ways for supporting the sections, said sections being arranged and supported on the ways so that the first of the series may be removed, the remaining sections advanced, and a freshly-charged section inserted at the end of the series, substantially as and for the purpose specified.

3. In an apparatus for filtering petroleum, its liquid products, or other similar liquids, the combination of a chamber capable of being heated by hot air or otherwise, with one or more hollow filtering-cylinders, each cylinder being composed of sections removably supported within the heated chamber in a horizontal or substantially horizontal position, the sections being placed end to end, and the cylinder so formed extending between openings in the opposite walls of the chamber, and having removable caps or covers and inlet and outlet pipes, substantially as and for the purpose specified.

4. A filtering-cylinder composed of two or more removable sections, d e f g, having flanges i, and an intervening packing and a securing device or clamp for producing a tight joint, substantially as and for the purpose specified.

In testimony whereof I have hereunto set my hand this 5th day of December, A. D. 1883.

CHARLES FREDERICK HOLDSHIP.

Witnesses:
W. B. CORWIN,
THOMAS W. BAKEWELL.